United States Patent [19]

Kishishita et al.

[11] Patent Number: 5,229,912
[45] Date of Patent: Jul. 20, 1993

[54] TRIMMER CAPACITOR

[75] Inventors: Hiroyuki Kishishita; Jun Harada, both of Kyoto, Japan

[73] Assignee: Murata Manufacturing Co., Ltd., Japan

[21] Appl. No.: 869,658

[22] Filed: Apr. 16, 1992

[30] Foreign Application Priority Data

Apr. 22, 1991 [JP] Japan ................. 3-90228

[51] Int. Cl.$^5$ ........................... H01G 5/06
[52] U.S. Cl. ........................... 361/298
[58] Field of Search ............ 361/293, 298, 299; 29/25.42

[56] References Cited

U.S. PATENT DOCUMENTS

| | | | |
|---|---|---|---|
| 2,745,993 | 5/1956 | Foster | 361/293 X |
| 3,883,937 | 5/1975 | Alexander et al. | 29/25.42 |
| 4,220,980 | 9/1980 | Yamamoto et al. | 361/293 |
| 4,353,106 | 10/1982 | Shirakawa | 361/293 |

Primary Examiner—Donald A. Griffin
Attorney, Agent, or Firm—Ostrolenk, Faber, Gerb & Soffen

[57] ABSTRACT

In a trimmer capacitor comprising a stator having a stator electrode, a rotor having a rotor electrode and a shaft holding the rotor in a rotatable manner with respect to the stator, the stator is formed of resin containing a dielectric ceramic material. The stator electrode is located in the interior of the stator, so that the stator electrode is opposed to the rotor electrode through a dielectric layer which is defined by an integral part of the stator. The stator, the stator electrode and the dielectric member which are required for the trimmer capacitor are entirely integrated with each other in the stator, whereby the trimmer capacitor can be easily assembled. The resin, containing the dielectric ceramic material, forming the dielectric layer is superior in shock resistance to a ceramic material, whereby no problem of cracking etc. occurs even if the thickness of the dielectric layer is reduced.

8 Claims, 4 Drawing Sheets

TRIMMER CAPACITOR

BACKGROUND OF THE INVENTION

1. Field of the Invention

The present invention relates to a trimmer capacitor, and more particularly, it relates to a trimmer capacitor which is adapted to change an effective opposite, area of a stator electrode and a rotor electrode, which are opposed to each other through a dielectric member, by rotation of a rotor, thereby changing the capacitance.

2. Description of the Background Art

FIG. 7 shows a conventional trimmer capacitor 1, which is of interest to the present invention.

The trimmer capacitor 1 comprises a stator 2, which holds a stator terminal 3. The stator terminal 3 is integrally formed with a stator electrode 4, which is arranged to extend along the upper surface of the stator 2. The stator 2, which is formed of an insulating resin, is molded in a state receiving the integral combination of the stator terminal 3 and the stator electrode 4 therein.

A dielectric ceramic plate 5 is arranged to be in contact with a surface of the stator 2 which is provided with the stator electrode 4. A rotor electrode 6 is formed on the ceramic plate 5 to be opposed to the stator electrode 4 through the ceramic plate 5.

A center shaft 7 of a metal is arranged to pass through the stator 2 and the ceramic plate 5. The center shaft 7, comprising a driver adjusting groove 8, is electrically in contact with the rotor electrode 6. This center shaft 7 is rotated with the ceramic plate 5, to define a rotor of the trimmer capacitor 1 with the ceramic plate 5.

A rotor terminal 9 is arranged on the lower surface side of the stator 2. This rotor terminal 9 is integrally formed with a conical spring 10. The lower end of the center shaft 7, passing through the rotor terminal 9, is so crimped that the center shaft 7 and the ceramic plate 5 are jointly rotatable with respect to the stator 2 while the center shaft 7 is electrically connected with the rotor terminal 9.

In such a trimmer capacitor 1, the center shaft 7 is so rotated as to rotate the ceramic plate 5 in contact with the stator 2, thereby changing an effective opposite area of the stator electrode 4 and the rotor electrode 6. Thus, it is possible to vary the capacitance which exists across the stator terminal 3 rotor terminal 9.

However, the aforementioned trimmer capacitor 1 has the following problems:

In order to attain high maximum capacitance, it is necessary to reduce the thickness of the ceramic plate 5. However, the ceramic plate 5 may be disadvantageously cracked if the same is reduced in thickness. Although an electrode corresponding to the rotor electrode 6 may be provided in the interior of such a ceramic plate, it is technically difficult to connect such an internal electrode to the exterior and to control the effective element thickness of the ceramic plate by polishing the same, and therefore, quality is unstable in this case.

In order to build the ceramic plate 5 into the trimmer capacitor 1, on the other hand, it is necessary to sort front and rear surfaces thereof and to locate the same. Such operations are made more complicated or difficult as the trimmer capacitor 1 is miniaturized.

SUMMARY OF THE INVENTION

Accordingly, an object of the present invention is to provide a trimmer capacitor in which cracking of a dielectric ceramic plate, is not a problem and which can be easily assembled even if the same is miniaturized.

The present invention is directed to a trimmer capacitor comprising a stator having a stator electrode and a rotor having a rotor electrode, which is opposed to the stator electrode through a dielectric member, and being held rotatable with respect to the stator. In order to solve the aforementioned technical problems, the stator is formed of resin containing a dielectric ceramic material, and the stator electrode is located in the interior of the stator.

According to the present invention, the stator electrode is opposed to the rotor electrode through a part of the stator, which is formed of resin containing a dielectric ceramic material. Therefore, the stator, which holds the stator electrode, also serves as a dielectric member due to the material thereof.

According to the present invention, as hereinabove described, it is possible to integrally handle the stator, the dielectric member and the stator electrode, which are required for the trimmer capacitor, as a single component of the stator, whereby the trimmer capacitor can be easily assembled to improve productivity, and the assembling cost can be reduced.

The stator which is formed of resin containing a dielectric ceramic material is superior in shock resistance to a dielectric member, such as the dielectric ceramic plate 5 shown in FIG. 7, which is made of only a ceramic material. Therefore, it is possible to reduce the thickness of the dielectric member, i.e. the distance between the outer surface of the stator and the stator electrode which is located in its interior, to not more than 100 $\mu$m, for example, with no problem of cracking. Thus, it is possible to attain high maximum capacitance, and the trimmer capacitor can be miniaturized.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
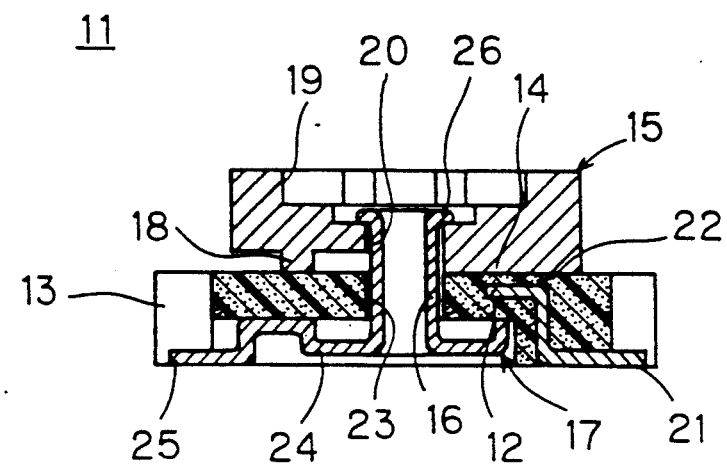
FIG. 1 is a cross-sectional view showing a trimmer capacitor 11 according to an embodiment of the present invention.
Figure 2:
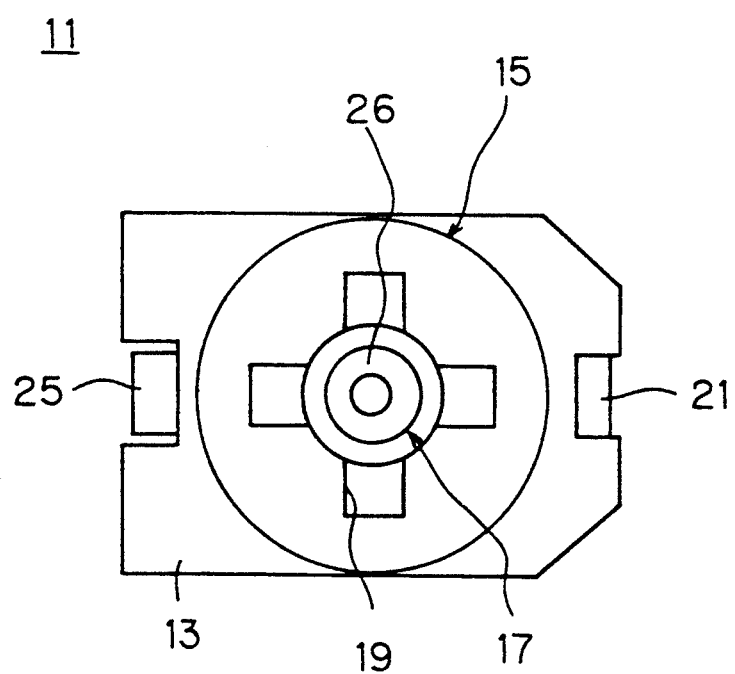
FIG. 2 is a plan view of the trimmer capacitor 11 shown in FIG. 1.

FIGS. 1 and 2 are a cross-sectional view and a plan view showing a trimmer capacitor 11 according to an embodiment of the present invention respectively.

Figure 3:
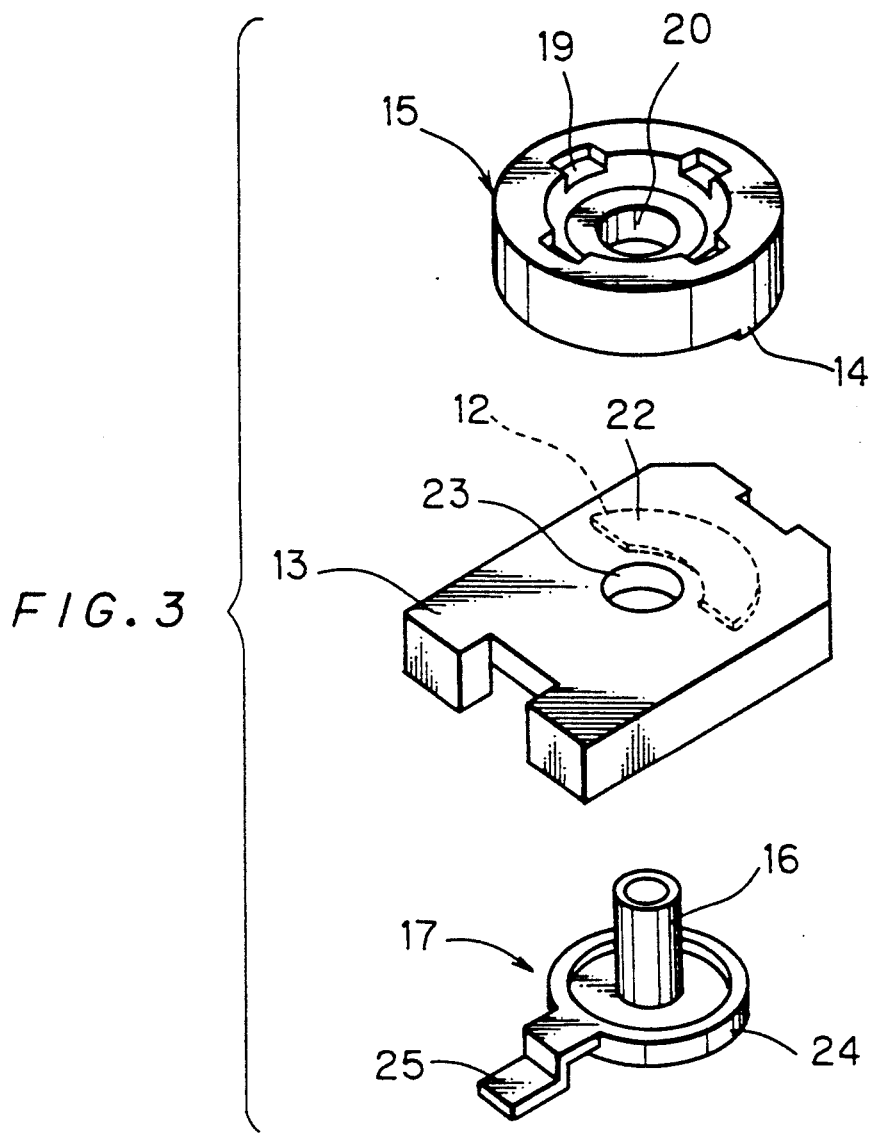
FIG. 3 is a perspective view showing the unassembled elements forming the trimmer capacitor 11 shown in FIG. 1.

The trimmer capacitor 11 comprises a stator 13 having a stator electrode 12, a rotor 15 having a rotor electrode 14 which is opposed to the stator electrode 12 through a part of the stator 13, and a center shaft providing member 17 which forms a shaft 16 holding the rotor 15 in a rotatable manner with respect to the stator 13. FIG. 3 shows an unassembled state of these elements.

Figure 4:
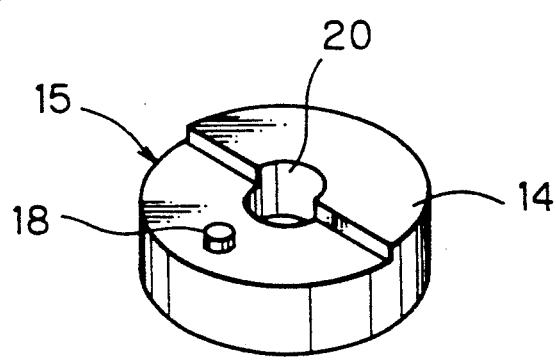
FIG. 4 is a perspective view showing the lower surface of a rotor 15 shown in FIG. 3.

In more concrete terms, the rotor 15 is made of a metal as a whole. FIG. 4 shows the lower surface of the rotor 15. The rotor electrode 14 is defined by a stepped portion protruding from the lower surface of the rotor 15. A projection 18 is formed to be flush with the rotor electrode 14, in order to prevent the rotor 15 from inclination toward the stator 13. As shown in FIG. 3, the rotor 15 is provided on its upper surface with driver adjusting grooves 19. The rotor 15 is further provided with a central hole 20 passing therethrough.

Figure 5:
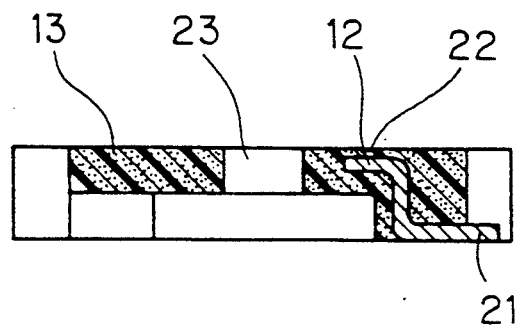
FIG. 5 is a cross-sectional view of the stator 13.
Figure 6:
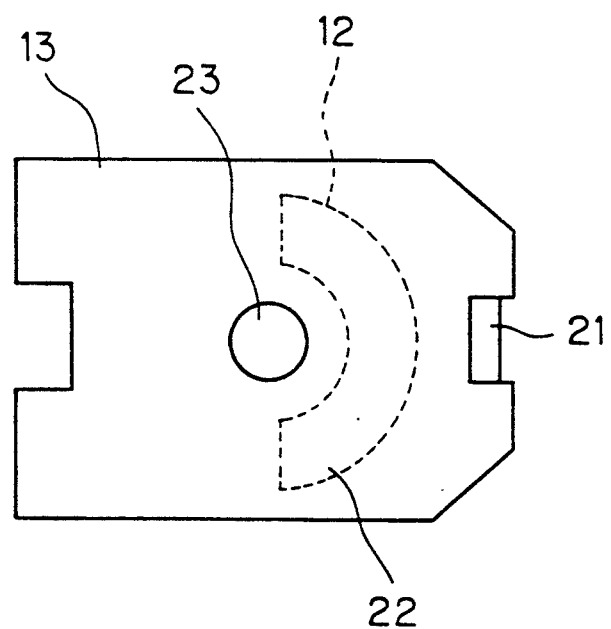
FIG. 6 is a plan view of the stator 13.
Figure 7:
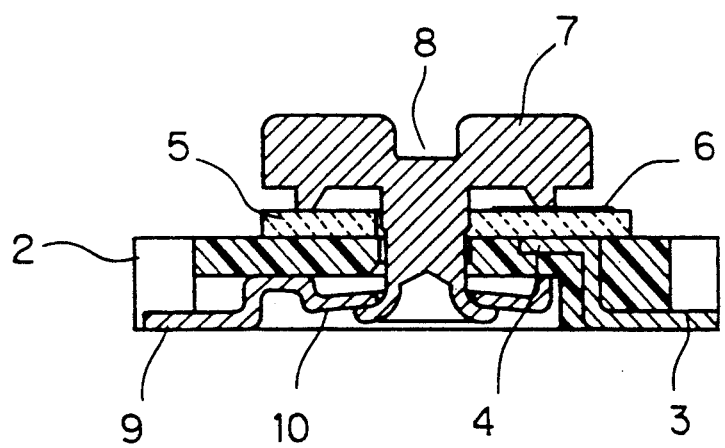
FIG. 7 is a cross-sectional view showing a conventional trimmer capacitor 1.

The stator 13 is formed of resin which contains a dielectric ceramic material. FIGS. 5 and 6 are a cross-sectional view and a plan view showing the stator 13 respectively. The stator electrode 12 is located in the interior of the stator 13, and integrally formed with a stator terminal 21. The stator 13 can be molded with the integral combination of the stator electrode 12 and the stator terminal 21, for example. Thus, a dielectric layer 22 is defined between the outer surface of the stator 13 and the stator electrode 12 by the resin containing the dielectric ceramic material. While the maximum capacitance can be increased as the dielectric layer 22 is reduced in thickness, it may be necessary to define the dielectric layer 22 with a relatively large thickness in a stage of molding, due to flowability of the molded composite resin containing the dielectric ceramic material. Further, a sliding face provided by the outer surface of the dielectric layer 22 may be inferior in flatness after molding. In these cases, the upper surface of the stator 13 corresponding to the outer surface of the dielectric layer 22 may be surface-ground after the molding, in order to adjust the thickness of the dielectric layer 22 and the flatness of its outer surface.

The composite resin for forming the stator 13 is prepared from a mixture of 10 to 80 volume percent of a dielectric ceramic material and 20 to 90 volume percent of a polymeric material, for example. The dielectric ceramic material may be prepared from $BaTiO_3$, $TiO_2$, $SrTiO_3$, $PbTiO_3$, $La_2TiO_7$, $MgTiO_3$ or $CaTiO_3$, or a mixture thereof. The polymeric material may be prepared from thermosetting resin or thermoplastic resin. In more concrete terms, the thermosetting resin may be prepared from epoxy resin, phenol resin, silicone resin, polybutadiene or the like, while the thermoplastic resin may be prepared from polyethylene, polypropylene, polybutylene terephthalate, polystyrene, polyphenylene sulfide, polyphenylen oxide or the like. In a more specific example, it is possible to obtain the stator 13 by roughly mixing polybutylene terephthalate with $BaTiO_3$ in a volume ratio of 3:2, melting and kneading the mixture in a two-axis kneader/extruder, pelletizing the mixture and molding the as-formed pellet with the stator electrode 12 and the stator terminal 21.

The stator 13 is provided with a central hole 23 passing therethrough.

The center shaft providing member 17 is formed by a metal plate as a whole. A conical spring 24 is integrally formed with the shaft 16, and a rotor terminal 25 is formed to outwardly extend from the spring 24.

The trimmer capacitor 11 comprising the rotor 15, the stator 13 and the center shaft providing member 17 is assembled in the following manner:

With reference to the shaft 16 of the center shaft providing member 17, the stator 13 is first arranged to receive the shaft 16 in its central hole 23, and then the rotor 15 is arranged to also receive the shaft 16 in its central hole 20. Then, the upper end of the shaft 16 is crimped to define an engaging part 26, which is engaged with the rotor 15.

In the trimmer capacitor 11 assembled in the aforementioned manner, the stator 13 and the rotor 15 are brought into close contact with each other through the action of the spring 24, so that the rotor electrode 14 is maintained in close contact with the outer surface of the dielectric layer 22 which is located within the stator 13. An appropriate tool is applied to the driver adjusting grooves 19 to rotate the rotor 15, thereby changing an effective opposite area of the stator electrode 12 and the rotor electrode 14, which are opposed to each other through the dielectric layer 22. Thus, it is possible to vary capacitance which is drawn across the stator terminal 21 and the rotor terminal 25.

Although the present invention has been described and illustrated in detail, it is clearly understood that the same is by way of illustration and example only and is not to be taken by way of limitation, the scope of the present invention being limited only by the terms of the appended claims.

What is claimed is:

1. A trimmer capacitor comprising:
   a stator having a stator electrode; and
   a rotor having a rotor electrode being opposed to said stator electrode through a dielectric member formed by an integral portion of said stator, said rotor being held rotatable with respect to said stator, wherein said stator is formed of resin containing a dielectric ceramic material, and said stator electrode is located in the interior of said stator.

2. A trimmer capacitor in accordance with claim 1, wherein said stator has a surface which is in contact with said rotor electrode, said surface being provided by surface grinding.

3. A trimmer capacitor in accordance with claim 1, wherein said stator contains 10 to 80 volume percent of said dielectric ceramic material and 20 to 90 volume percent of a polymeric material.

4. A trimmer capacitor in accordance with claim 3, wherein said dielectric ceramic material includes at least one material selected from a group of $BaTiO_3$, $TiO_2$, $SrTiO_3$, $PbTiO_3$, $La_2TiO_7$, $MgTiO_3$, and $CaTiO_3$.

5. A trimmer capacitor in accordance with claim 3, wherein said polymeric material includes one material selected from a group of epoxy resin, phenol resin, silicone resin, polybutadiene, polyethylene, polypropylene, polybutylene terephthalate, polyphenylene sulfide, polyphenylene oxide and polystyrene.

6. A trimmer capacitor in accordance with claim 1, wherein said stator electrode is integrally formed with a stator terminal which is extended toward the exterior of said stator.

7. A trimmer capacitor in accordance with claim 1, wherein said stator and said rotor comprise central holes respectively, said trimmer capacitor further comprising a shaft passing through said central holes for holding said rotor in a rotatable manner with respect to said stator.

8. A trimmer capacitor in accordance with claim 7, wherein said rotor and said shaft are made of metals respectively and said shaft comprises an engaging part which is electrically in contact with said rotor and engaged with said rotor, said shaft being integrally formed with a conical spring, which is engaged with said stator, and a rotor terminal.

* * * * *